United States Patent
Anil (10) Patent No.: US 9,906,627 B2
(45) Date of Patent: Feb. 27, 2018

(54) SYSTEM AND METHOD OF REDUCING ENCRYPTION OVERHEAD BY CONCATENATING MULTIPLE CONNECTION PACKETS ASSOCIATED WITH A SECURITY ASSOCIATION

(75) Inventor: Agiwal Anil, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 365 days.

(21) Appl. No.: 12/995,607

(22) PCT Filed: Jun. 3, 2009

(86) PCT No.: PCT/KR2009/002957
§ 371 (c)(1),
(2), (4) Date: Dec. 1, 2010

(87) PCT Pub. No.: WO2009/148263
PCT Pub. Date: Dec. 10, 2009

(65) Prior Publication Data
US 2011/0145561 A1    Jun. 16, 2011

(30) Foreign Application Priority Data
Jun. 3, 2008   (IN) ................... 1349/CHE/2008

(51) Int. Cl.
*H04L 29/06*     (2006.01)
(52) U.S. Cl.
CPC .......... *H04L 69/04* (2013.01); *H04L 63/0428* (2013.01); *H04L 63/164* (2013.01)
(58) Field of Classification Search
CPC ... H04L 69/04; H04L 63/0428; H04L 63/164; H04W 12/02; H04W 84/12; H04W 84/04; H04W 84/06; H04W 84/08; H04W 84/10
(Continued)

(56) References Cited

U.S. PATENT DOCUMENTS 6,590,882 B1   7/2003   Fong et al.
7,412,539 B2 *   8/2008   Gmuender et al. .......... 709/246
(Continued)

FOREIGN PATENT DOCUMENTS

CN         1581854 A    2/2005
JP      2009-188751 A    8/2009
(Continued)

OTHER PUBLICATIONS

IEEE Standard for Local and metropolitan area networks Part 16: Air Interface for Broadband Wireless Access Systems Amendment 3: Advanced Air Interface, IEEE Std 802.16m-2011, IEEE, 2011, pp. 306-317.
(Continued)

*Primary Examiner* — Thuong Nguyen
(74) *Attorney, Agent, or Firm* — Jefferson IP Law, LLP (57) ABSTRACT

A method and system for encryption is provided. The method includes detecting one or more security associations corresponding to data payloads in response to receipt of the data payloads from multiple source connections. Each data payload includes one or more data packets from each source connection. The method also includes concatenating the data payloads corresponding to each security association. Further, the method includes encrypting the concatenated data payloads for each security association. The system includes a determination module that detects one or more security associations corresponding to data payloads in response to receipt of the data payloads from multiple source connections and concatenates the data payloads corresponding to each security association. The system also includes an encryption module that encrypts the concatenated data payloads for each security association.

36 Claims, 7 Drawing Sheets

(58) Field of Classification Search
USPC ............... 709/206, 246, 231; 713/186, 150; 726/28
See application file for complete search history.

(56) References Cited

U.S. PATENT DOCUMENTS

| | | |
|---|---|---|
| 2003/0018796 A1* | 1/2003 | Chou et al. .................... 709/231 |
| 2003/0069939 A1* | 4/2003 | Russell .......................... 709/214 |
| 2005/0030965 A1* | 2/2005 | Aoki et al. .................... 370/432 |
| 2005/0102504 A1 | 5/2005 | Le et al. |
| 2005/0180568 A1* | 8/2005 | Krause .......................... 380/212 |
| 2006/0002416 A1* | 1/2006 | Yagihashi ...................... 370/428 |
| 2006/0062225 A1* | 3/2006 | Li .......................... H04L 49/355 370/396 |
| 2006/0074985 A1* | 4/2006 | Wolfish et al. ............. 707/104.1 |
| 2006/0075027 A1* | 4/2006 | Zager et al. .................. 709/206 |
| 2006/0191020 A1* | 8/2006 | Miller ............................. 726/28 |
| 2006/0236300 A1* | 10/2006 | Lajolo et al. .................. 717/100 |
| 2006/0271457 A1* | 11/2006 | Romain et al. ................... 705/35 |
| 2006/0288204 A1* | 12/2006 | Sood ...................... H04L 63/123 713/161 |
| 2008/0285501 A1* | 11/2008 | Zhang et al. .................. 370/315 |
| 2009/0070593 A1* | 3/2009 | Boshra et al. ................. 713/186 |
| 2009/0089576 A1* | 4/2009 | Johnston ....................... 713/160 |
| 2009/0172394 A1* | 7/2009 | Johnston et al. ............. 713/160 |
| 2009/0196421 A1 | 8/2009 | Okuda |
| 2009/0217043 A1* | 8/2009 | Metke et al. ................. 713/171 |
| 2009/0220085 A1* | 9/2009 | Tao et al. ...................... 380/270 |
| 2011/0128973 A1* | 6/2011 | Yonge et al. .................. 370/469 |
| 2013/0286986 A1* | 10/2013 | Legg .............................. 370/329 |

FOREIGN PATENT DOCUMENTS

| | | |
|---|---|---|
| KR | 10-0383609 B1 | 5/2003 |
| KR | 10-2004-0102624 A | 12/2004 |
| KR | 10-0479345 B1 | 3/2005 |
| KR | 10-0612255 B1 | 8/2006 |
| WO | 2007/092887 A2 | 8/2007 |
| WO | 2009/061110 A1 | 5/2009 |

OTHER PUBLICATIONS

Tao, Zhifeng et al., Performance Improvement for Multichannel HARQ Protocol in Next Generation WiMAXSystem, Proceedings of 2008 IEEE Wireless Communications and Networking Conference (WCNC 2008), IEEE, Apr. 2008, pp. 2009-2014.

Agiwal, Anil et al., Proposed Text on Construction & Transmission of MAC PDU section for AWD, IEEE C802.16m-09/0981, IEEE 802.16 Working Group on Broadband Wireless Access Standards, Apr. 2009.

IEEE Standard for Local and metropolitan area networks Part 16-Air Interface for Fixed Broadband Wireless Access Systems, IEEE Std 802.16-2004, IEEE, 2004, pp. 121-128.

Anil Agiwal, Multiplexing Extended Header Format for 802.16m; C80216m-09_0394, IEEE Draft; C80216M-09_0394, IEEE-SA, Feb. 27, 2009, pp. 1-8, vol. 802.16m, Piscataway, NJ, USA.

Korean Notice of Patent Grant, dated Sep. 25, 2015, Application No. 10-2010-7026868.

Chinese Office Action, dated Nov. 23, 2015, Application No. 200980120704.X.

IEEE Std 802.16-2004, IEEE Standard for Local and metropolitan area networks Part 16: Air Interface for Fixed Broadband Wireless Access Systems, 2004.

* cited by examiner

SYSTEM AND METHOD OF REDUCING ENCRYPTION OVERHEAD BY CONCATENATING MULTIPLE CONNECTION PACKETS ASSOCIATED WITH A SECURITY ASSOCIATION

TECHNICAL FIELD

The present disclosure relates generally to the field of electronic data communication. More particularly, the present disclosure relates to a method and a system for encryption.

BACKGROUND ART

In the current scenario, broadband wireless networks provide a wide range of data communication services to users such as voice over internet protocol. The data communication services involve transmission of data across the wireless networks using packet data technology. Typically, data packets transmitted across the wireless networks are encrypted to protect privacy of a user and to provide secure data communication. The encryption is achieved by applying cryptographic transforms to each data payload carried from each connection in a subscriber station to a base station and vice versa. Further, the encryption of the data entails adding an additional header field to each data payload. However, the overhead of encrypting multiple data payloads originating from multiple connections independently increases utilization of network bandwidth, processing time, and consumption of energy resources at the subscriber station and the base station. Moreover, generating and adding the header field to each data payload originating from each connection augments the overhead.

In light of the foregoing discussion there is a need for a method and system for encrypting the data payloads originating from multiple connections by minimizing the overhead.

DISCLOSURE OF INVENTION

Technical Solution

Embodiments of the present disclosure described herein provide a method and system for encryption.

An example of a method for encryption includes detecting one or more security associations corresponding to data payloads in response to receipt of the data payloads from multiple source connections. The method also includes concatenating the data payloads corresponding to each security association. Further, the method includes encrypting the concatenated data payloads for each security association.

An example of a system for encrypting includes a determination module that detects one or more security associations corresponding to data payloads in response to receipt of the data payloads from multiple source connections and concatenates the data payloads corresponding to each security association. The system also includes an encryption module that encrypts the concatenated data payloads for each security association.

An example of an electronic device includes a communication interface that sends and receives data packets including protocol data units. The electronic device also includes a memory for storing information. Further, the electronic device includes a processor responsive to the information to detect one or more security associations corresponding to data payloads in response to receipt of the data payloads from multiple source connections. The processor also performs concatenation of the data payloads corresponding to each security association and encryption of the concatenated data payloads for each security association.

BRIEF DESCRIPTION OF DRAWINGS

The accompanying figures, similar reference numerals may refer to identical or functionally similar elements. These reference numerals are used in the detailed description to illustrate various embodiments and to explain various aspects and advantages of the present disclosure.

Persons skilled in the art will appreciate that elements in the figures are illustrated for simplicity and clarity and may have not been drawn to scale. For example, the dimensions of some of the elements in the figures may be exaggerated relative to other elements to help to improve understanding of various embodiments of the present disclosure.

BEST MODE FOR CARRYING OUT THE INVENTION

It should be observed that method steps and system components have been represented by conventional symbols in the figures, showing only specific details that are relevant for an understanding of the present disclosure. Further, details that may be readily apparent to person ordinarily skilled in the art may not have been disclosed. In the present disclosure, relational terms such as first and second, and the like, may be used to distinguish one entity from another entity, without necessarily implying any actual relationship or order between such entities.

Embodiments of the present disclosure described herein provide a method and system for encryption.

Figure 1:
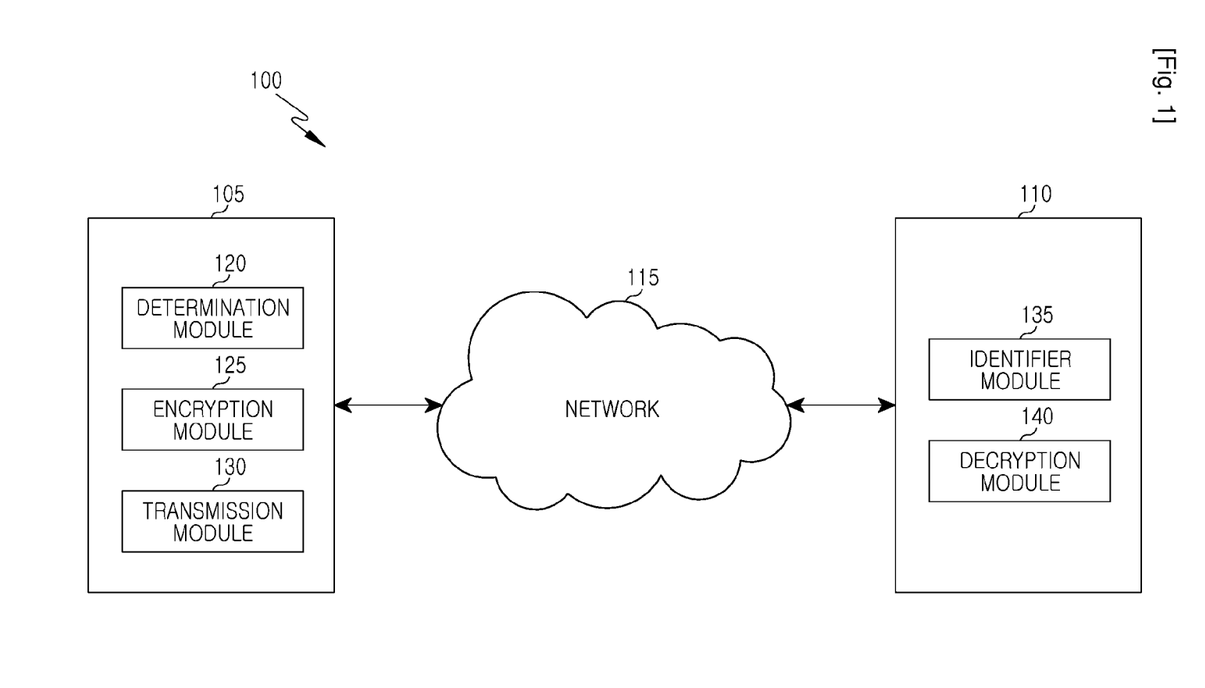
FIG. 1 is a block diagram of an environment, in accordance with which various embodiments can be implemented.

FIG. 1 is a block diagram of an environment 100, in accordance with which various embodiments can be implemented.

The environment 100 includes a transmitting unit 105 and a receiving unit 110. The transmitting unit 105 is in communication with the receiving unit 110 through a network 115. Examples of the network 105 include, but are not limited to, a Worldwide Interoperability for Microwave Access (WiMax) network, local area network (LAN), a wide area network (WAN), Bluetooth network, internet protocol multimedia subsystem (IMS) network, infrared network, zigbee network, wireless LAN network (WLAN) or any other wireless network specified by the Institute of Electrical and Electronics Engineers (IEEE).

The transmitting unit 105 includes a determination module 120 that determines security associations corresponding to data payloads from multiple source connections. Each data payload includes one or more data packets from each source connection. A security association is a set of security information shared between the transmitting unit 105 and the receiving unit 110 to support secure communication across the network 115. Further, the determination module 120 concatenates the data payloads received from the multiple source connections corresponding to each security association. The transmitting unit 105 also includes an encryption module 125 that encrypts the concatenated data payloads for each security association. The encryption involves transformation of data using an algorithm. Further, the transmitting unit 105 includes a transmission module 130 that generates a protocol data unit for the encrypted data payloads and transmits the protocol data unit.

The receiving unit 110 includes an identifier module 135 for identifying the one or more security associations in the protocol data unit received from the transmitting unit 105. Further, the identifier module 135 performs identifying the encrypted data payloads associated with the one or more security associations and identifying security information to decrypt the encrypted data payloads. The receiving unit 110 also includes a decryption module 140 for decrypting the encrypted data payloads using the security information and identifying destination connections associated with each decrypted data payload. The receiving unit 110 also renders each decrypted payload to a destination connection based on the identification of the destination connections.

In some embodiments, the transmitting unit 105 can perform tasks associated with the receiving unit 110 and vice versa.

In various embodiments, the transmitting unit 105 can correspond to a subscriber station and the receiving unit 110 can correspond to a base station and vice versa. The subscriber station can correspond to an electronic device. Examples of the electronic device include, but are not limited to, computer, laptop, mobile device, hand held device, and personal digital assistant (PDA).

Figure 2:
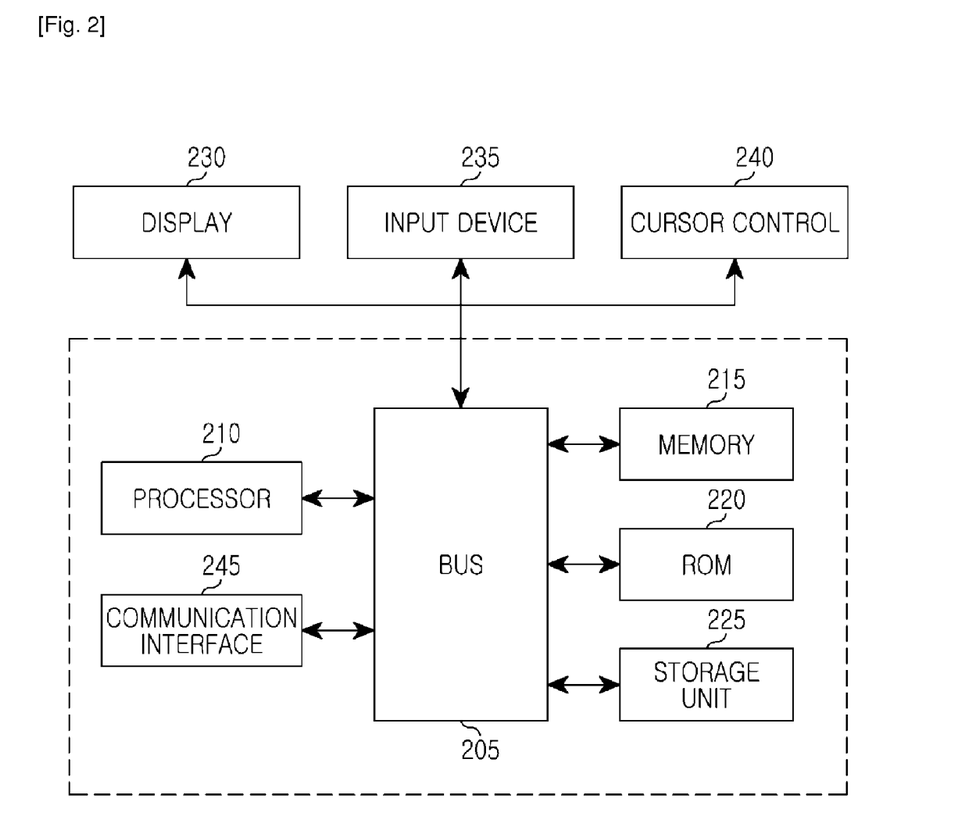
FIG. 2 is a block diagram of an electronic device, in accordance with one embodiment.

The electronic device including the elements is explained in detail in FIG. 2.

FIG. 2 is a block diagram of the electronic device, in accordance with one embodiment. The electronic device includes a bus 205 for communicating information, and a processor 210 coupled with the bus 205 for processing the information. The electronic device also includes a memory 215, for example a random access memory (RAM) coupled to the bus 205 for storing information required by the processor 210. The memory 215 can be used for storing temporary information required by the processor 210. The electronic device further includes a read only memory (ROM) 220 coupled to the bus 205 for storing static information required by the processor 210. A server storage unit 225, for example a magnetic disk, hard disk or optical disk, can be provided and coupled to bus 205 for storing information.

The electronic device can be coupled via the bus 205 to a display 230, for example a cathode ray tube (CRT) or liquid crystal display (LCD), for displaying information. An input device 235, including various keys, is coupled to the bus 205 for communicating information to the processor 210. In some embodiments, cursor control 240, for example a mouse, a trackball, a joystick, or cursor direction keys for communicating information to the processor 210 and for controlling cursor movement on the display 230 can also be present.

In one embodiment, the steps of the present disclosure are performed by the electronic device using the processor 210. The information can be read into the memory 215 from a machine-readable medium, for example the server storage unit 225. In alternative embodiments, hard-wired circuitry can be used in place of or in combination with software instructions to implement various embodiments.

The term machine-readable medium can be defined as a medium providing data to a machine to enable the machine to perform a specific function. The machine-readable medium can be a storage medium. The storage media can include non-volatile media and volatile media. The server storage unit 225 can be non-volatile media. The memory 215 can be volatile media. All such media must be tangible to enable the instructions carried by the media to be detected by a physical mechanism that reads the instructions into the machine.

Examples of the machine readable medium includes, but are not limited to, a floppy disk, a flexible disk, hard disk, magnetic tape, a CD-ROM, optical disk, punchcards, papertape, a RAM, a PROM, EPROM, and a FLASH-EPROM.

The machine readable medium can also include online links, download links, and installation links providing the information to the processor 210.

The electronic device also includes a communication interface 245 coupled to the bus 205 for enabling data communication. Examples of the communication interface 245 include, but are not limited to, an integrated services digital network (ISDN) card, a modem, a local area network (LAN) card, an infrared port, a Bluetooth port, a zigbee port, and a wireless port.

In some embodiments, the processor 210 can include one or more processing units for performing one or more functions of the processor 210. The processing units are hardware circuitry performing specified functions.

The one or more functions include detecting one or more security associations corresponding to data payloads in response to receipt of the data payloads from multiple source connections, concatenating the data payloads corresponding to each security association, and encrypting the concatenated data payloads for each security association. The source connections can correspond to software applications, for example, internet browser, file transfer protocol (FTP), and voice over internet protocol (VoIP), executed by the processor that are in electronic communication with the network 115. The one or more functions also include generating a protocol data unit for the encrypted data payloads and transmitting the protocol data unit.

In some embodiments, the electronic device can also correspond to the receiving unit 110. The functions of the processor of the electronic device acting as the receiving unit 110 can include identifying the one or more security associations in the protocol data unit received from the base station functioning as the transmitting unit 105. The functions of the processor also include identifying the encrypted data payloads associated with the one or more security associations and identifying security information to decrypt the encrypted data payloads. Moreover, the functions of the processor can include decrypting the encrypted data payloads using the security information and identifying destination connections associated with each decrypted data payload. The functions of the processor can also include rendering each decrypted data payload to a destination connection based on the identification of the destination connections.

Figure 3:
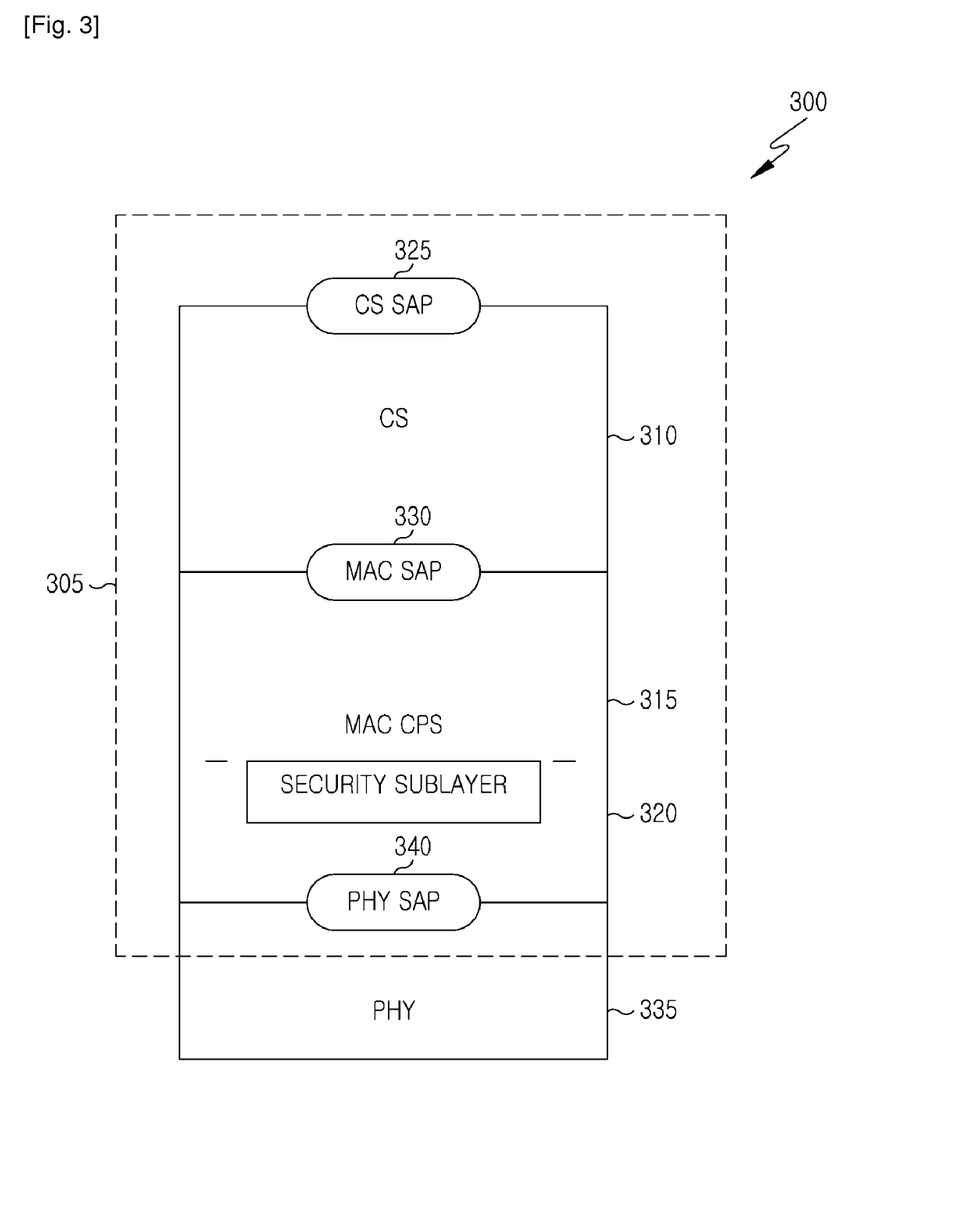
FIG. 3 is an exemplary illustration of a media access control (MAC) layer at a subscriber station and at a base station.

FIG. 3 is an exemplary illustration of a media access control (MAC) layer at a subscriber station (SS) and at a base station (BS).

The MAC 305 layer includes three sublayers, for example, service specific convergence sublayer (CS) 310, MAC common part sublayer (MAC CPS) 315, and a security sublayer 320.

The CS 310 provides transformation or mapping of external network data received through a CS service access point (SAP) 325 into MAC service data units (SDUs). The transformation or mapping includes classifying the MAC network SDUs and associating the MAC SDUs to a designated MAC connection.

The MAC CPS 315 provides core MAC functionality of system access, bandwidth allocation, connection establishment, and connection maintenance. The MAC CPS 315 receives data from the CS through the MAC SAP 330.

Data, physical layer (PHY) 335 control, and statistics are transferred between the MAC CPS 315 and PHY 335 via the PHY SAP 340.

The MAC CPS 315 also includes a separate security sublayer 320 for providing authentication, secure key exchange, and encryption. The security sublayer 320 defines a set of supported cryptographic suites using security associations. A security association is a set of security information the SS and the BS share to support secure communication across the network, for example, Institute of Electrical and Electronics Engineers (IEEE) 802.16e network.

Each MAC connection is associated with an SA. The multiple MAC connections can be associated with the same SA. Further, multiple MAC connections corresponding to each SA can exist simultaneously between the SS and the BS.

Figure 4:
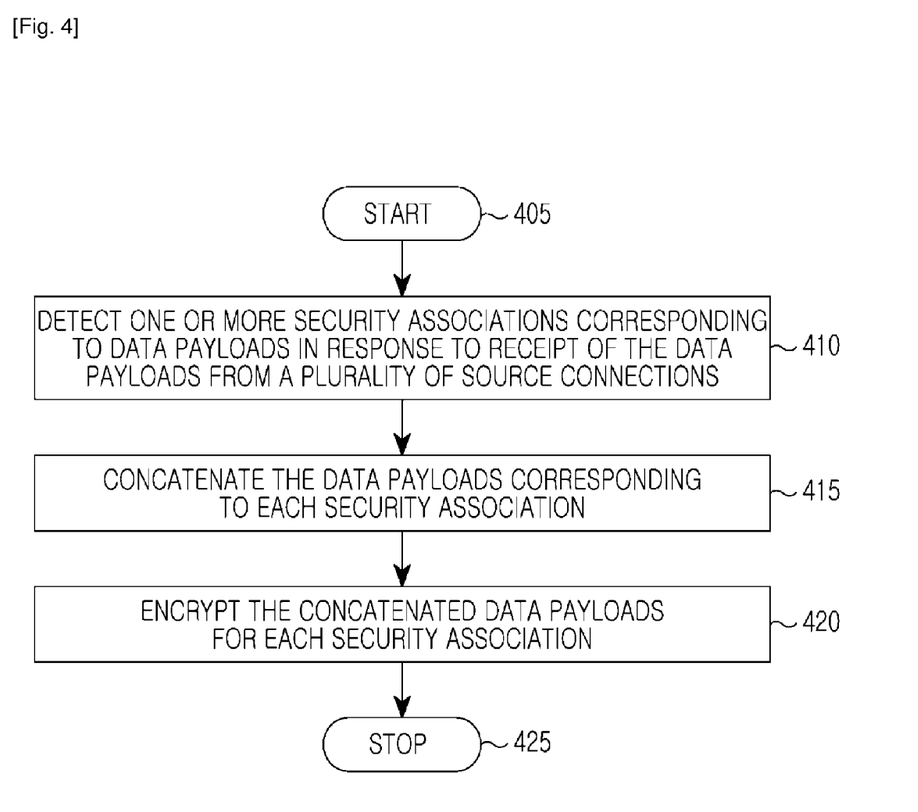
FIG. 4 is a flow diagram for encryption, in accordance with an embodiment.

FIG. 4 is a flow diagram for encryption, in accordance with an embodiment.

Data payloads from multiple source connections are received. Each source connection is associated with a security association (SA). The SA is a set of security information shared between two data communication points in the network. The shared information can include, but is not limited to, cryptographic suite, encryption keys, and initialization vectors. The multiple source connections can be associated with one or more SAs.

The method starts at step 405.

At step 410, the one or more SAs corresponding to the data payloads is detected in response to the receipt of the data payloads from the multiple source connections. Each data payload includes one or more data packets from each source connection, for example, one or more service data units (SDUs) received from a service specific convergence sublayer (CS) layer.

For example, in a Worldwide Interoperability for Microwave Access (WiMax) network system, if the data payloads including one or more medium access control (MAC) service data units (SDUs) or MAC SDU fragments are received from four source connections through the MAC common part sublayer (MAC CPS) of the MAC layer, then the SAs of the data payloads received from each source connection are detected. Connection 1 and connection 2 of the four connections can be associated with a security association SA1 while connection 3 and connection 4 of the four connections can be associated with a security association SA2. The SAs corresponding to the data payloads from connection 1 and connections 2 are detected as SA1 and the SAs corresponding to the data payloads from connection 3 and connection 4 are detected as SA2 respectively.

At step 415, the data payloads from the multiple source connections corresponding to each security association are concatenated.

For example, in the WiMax system, if connection 1 and connection 2 are associated with a security association SA1, then MAC CPS concatenates the data payloads including the one or more MAC SDUs or the MAC SDU fragments of connection 1 and connection 2. The concatenated data payloads correspond to a single data payload and sent to security sublayer for encryption. Similarly, if connection 3 and connection 4 are associated with a security association SA2, then MAC CPS concatenates the data payloads of connection 3 and connection 4 associated with SA2.

At step 420, the concatenated data payloads for each security association are encrypted. The encryption can be based on, but not limited to, counter with cipher block chaining message authentication code (CCM) mode 128 bit Advanced Encryption Standard (AES) encryption, and counter (CTR) mode 128 bit AES encryption. Security information for the concatenated data payloads is generated and the security information is combined with the concatenated data payloads. The security information can be characterized by a packet number (PN) and an integrity check value (ICV). The PN and the ICV are added to the encrypted data payloads. The PN is generated for the concatenated data payloads encrypted in entirety. The PN is prepended to the encrypted data payload and the ICV is appended to the encrypted data payload.

In one embodiment, a protocol data unit (PDU) corresponding to the encrypted data payload is generated for each SA.

A header is generated for the protocol data unit corresponding to each SA. The header is generated by determining connection identifiers associated with each source connection, lengths of the data payloads and security information associated with each SA.

In another embodiment, the protocol data unit is generated for the encrypted data payloads for at least two SAs. The header is then generated for the concatenated data payloads corresponding to at least two SAs. The header is generated by determining connection identifiers, lengths of the data payloads and security information corresponding to at least two SAs.

In some embodiments, a default generic MAC header (GMH) generated for the protocol data unit is modified to form a modified GMH (M_GMH). The M_GMH can include, but is not limited to, connection identifiers corresponding to each source connection and length of data payloads from each source connection carried in the encrypted data payload associated with each SA. An extended security header can also be generated and appended to the protocol data unit. The extended security header can include, but is not limited to, security information associated with the concatenated data payloads.

The encryption of the concatenated data payloads and the generation of the header for the encrypted data payloads minimize processing overhead, resource utilization, and time taken for encrypting the data payloads from each source connection.

The PDU is transmitted to a receiver. The receiver identifies the one or more security associations in the protocol data unit received. The receiver also identifies the encrypted data payloads associated with the one or more security associations. Further, the receiver also identifies the security information to decrypt the encrypted data payloads. Moreover, the receiver decrypts the encrypted data payloads using the security information and identifies destination connections associated with each decrypted data payload. Each decrypted data payload is rendered to a destination connection based on the identification of the destination connections.

At step 425, the step ends.

Figure 5:
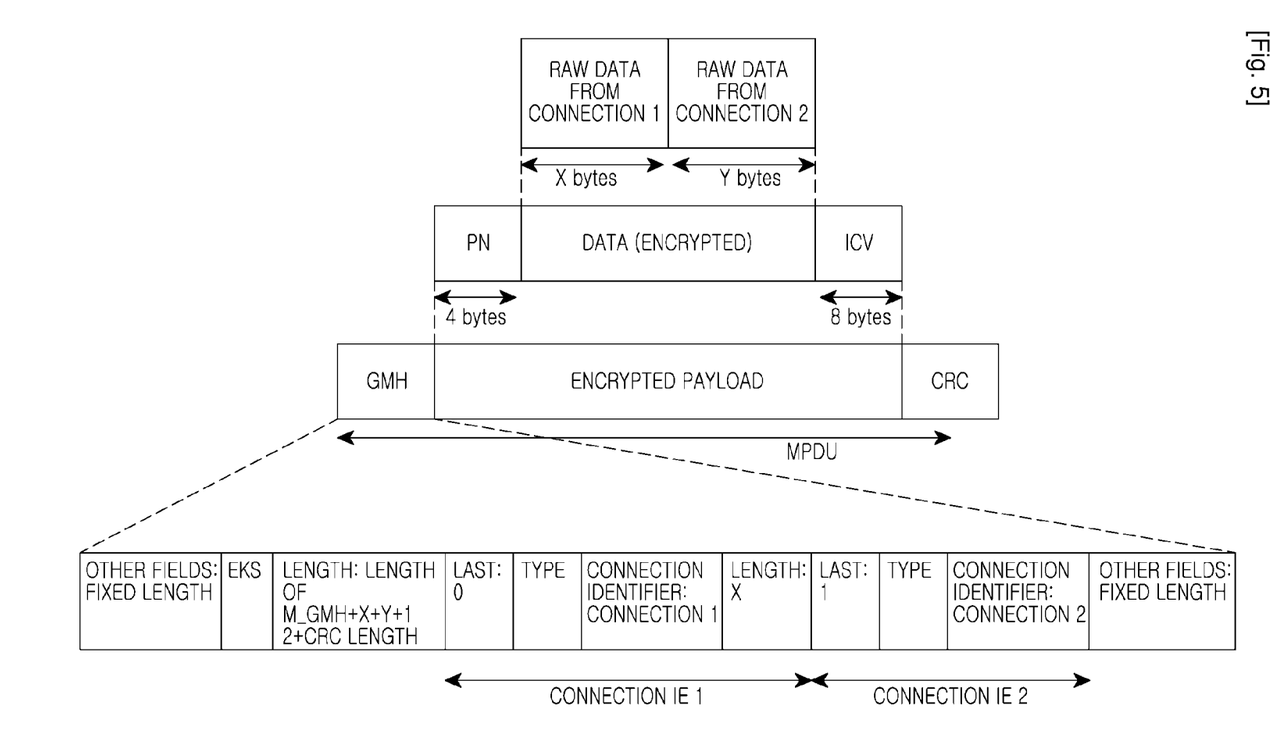
FIG. 5 is an exemplary illustration of generation of a MAC header for a protocol data unit (PDU) including data payloads concatenated from two source connections and encrypted, in accordance with one embodiment.

FIG. 5 is an exemplary illustration of generation of a MAC header for a protocol data unit (PDU) including data payloads concatenated from two source connections and encrypted, in accordance with one embodiment.

The MPDU is generated by concatenating data payloads of length X bytes and length Y bytes from two source connections connection 1 and connection 2 respectively associated with same security association (SA). A packet number (PN) and an integrity check value (ICV) are added to the encrypted data payloads. The PN is generated for the concatenated data payloads encrypted in entirety. The PN is pre pended to the encrypted data payload and the ICV is appended to the encrypted data payload. Typically, PN is approximately 8 bytes and ICV is approximately 4 bytes. The MPDU is generated for the encrypted data payload and the MAC header is generated for the MPDU. Exemplarily, the MAC header (GMH) generated for the MPDU for the two source connections includes the following:

EKS
Length (Length of MPDU)=Length of M_GMH+X+Y+12+CRC Length
Connection IE1
LAST=0
Type
Connection Identifier=connection 1
Length=X bytes
Connection IE2
LAST=1
Type
Connection Identifier=connection 2

The MPDU includes the MAC header (GMH) generated, and the CRC. The GMH includes three payload specific fields in addition to other payload relevant fields. The three payload specific fields are length, encryption key sequence (EKS) and connection information element (IE). The length field indicates the length of the MPDU. The length can be expressed in terms of computer memory units. The length of the MPDU includes length of a modified generic MAC header (M_GMH) generated for the concatenated and encrypted data payloads, length X bytes from connection 1, length Y bytes from connection 2, an additional 12 bytes corresponding to PN and ICV, and length of CRC.

The EKS indicates the sequence number of the encryption key used to encrypt the payload. The connection IE includes information related to the connection. The connection IE includes four connection specific fields, LAST, type, connection identifier and length. The LAST is a single bit field with values '0' or '1' corresponding to LAST. The value '0' indicates the source connection is the last connection IE and value of '1' indicates presence of one or more source connections following the current source connection. The type field indicates the sub-headers and special payload types present in the message payload of the source connection identified by the connection identifier. The connection identifier identifies the source connection of the data being carried. The length field corresponds to the length of the data payload.

The GMH is parsed at the receiver end receiving the MPDU. The security sublayer at the receiver end receives 'Length of MPDU-Length of GMH-Length of CRC' bytes for decrypting. The security sublayer decrypts the protocol data unit, removes the encryption headers PN and ICV, and renders the data payloads carried in the decrypted protocol data unit of size 'Length of MPDU-Length of GMH-Length of CRC-12' bytes to destination connections at the receiver end.

Figure 6:
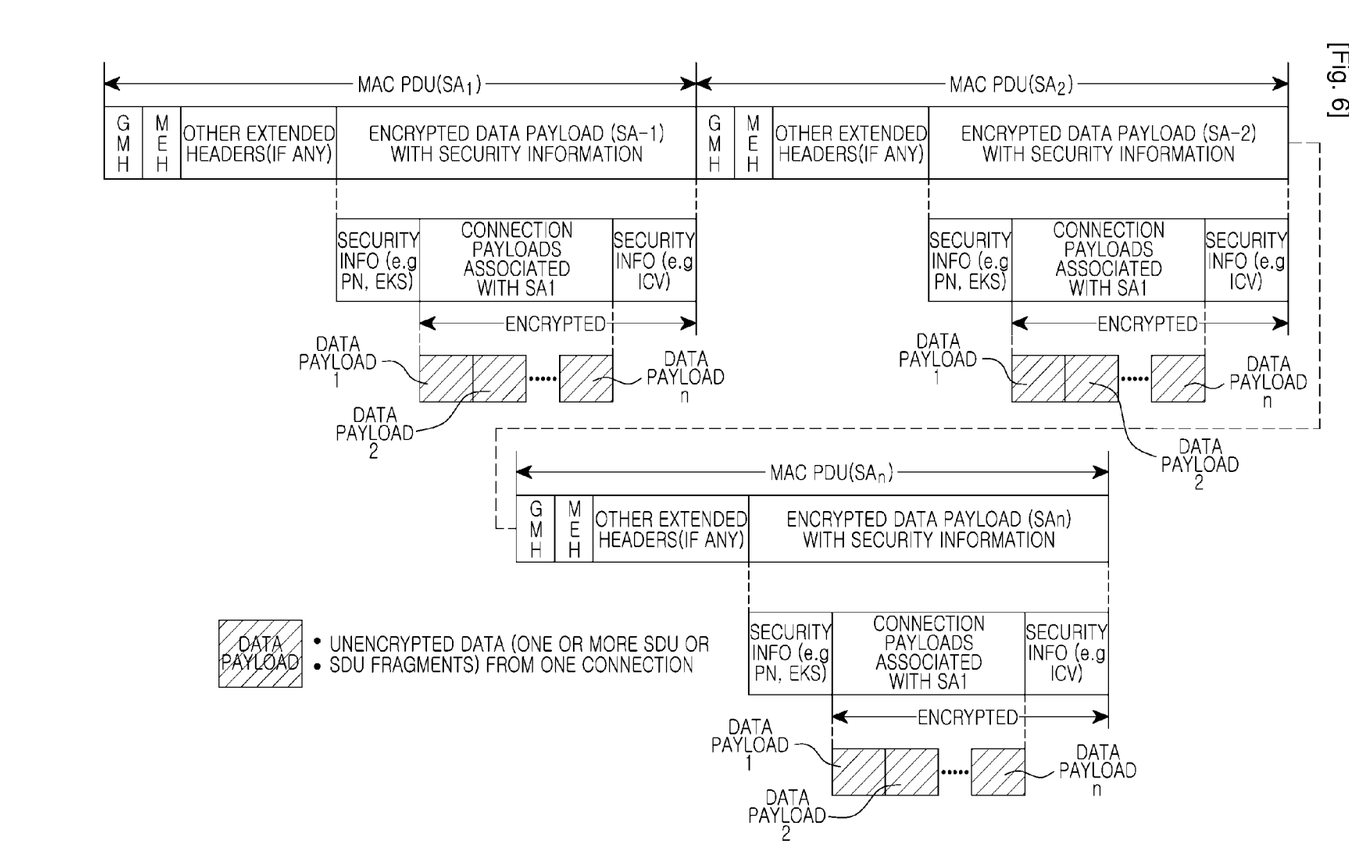
FIG. 6 exemplarily illustrates MAC PDUs generated for data payloads from multiple source connections with similar security associations, in accordance with one embodiment.

FIG. 6 exemplarily illustrates MAC PDUs generated for data payloads from multiple source connections with similar security associations, in accordance with one embodiment.

For example, consider data payloads from 'n' different source connections. Each of 'n' different source connections is associated with a SA. The MPDUs are generated by concatenating data payloads from source connections associated with same security association (SA), for example, MAC PDU (SA1) for SA1, MAC PDU (SA2) for SA2 and MAC PDU (SAn) for SAn. Security information comprising the packet number (PN) and the integrity check value (ICV) are added to the data payloads. The PN is generated for the concatenated data payloads encrypted in entirety. The PN is pre pended to the encrypted data payload and the ICV is appended to the encrypted data payload. Alternatively, an extended security header can also be generated and appended to the MPDU. The extended security header can include the security information, but is not limited to, PN, encryption key sequence (EKS), and ICV associated with the concatenated data payloads. Further, the MPDU is generated for the each encrypted data payload among the plurality of encrypted data payloads and the MAC header is generated separately for each MPDU.

Further, a GMH and an additional multiplexing extended header (MEH) are generated for each MPDU. The GMH and MEH together identify the source connections with data payloads concatenated in the MPDU and length of each data payload from each source connection. The MPDUs corresponding to each SA is transmitted sequentially.

Figure 7:
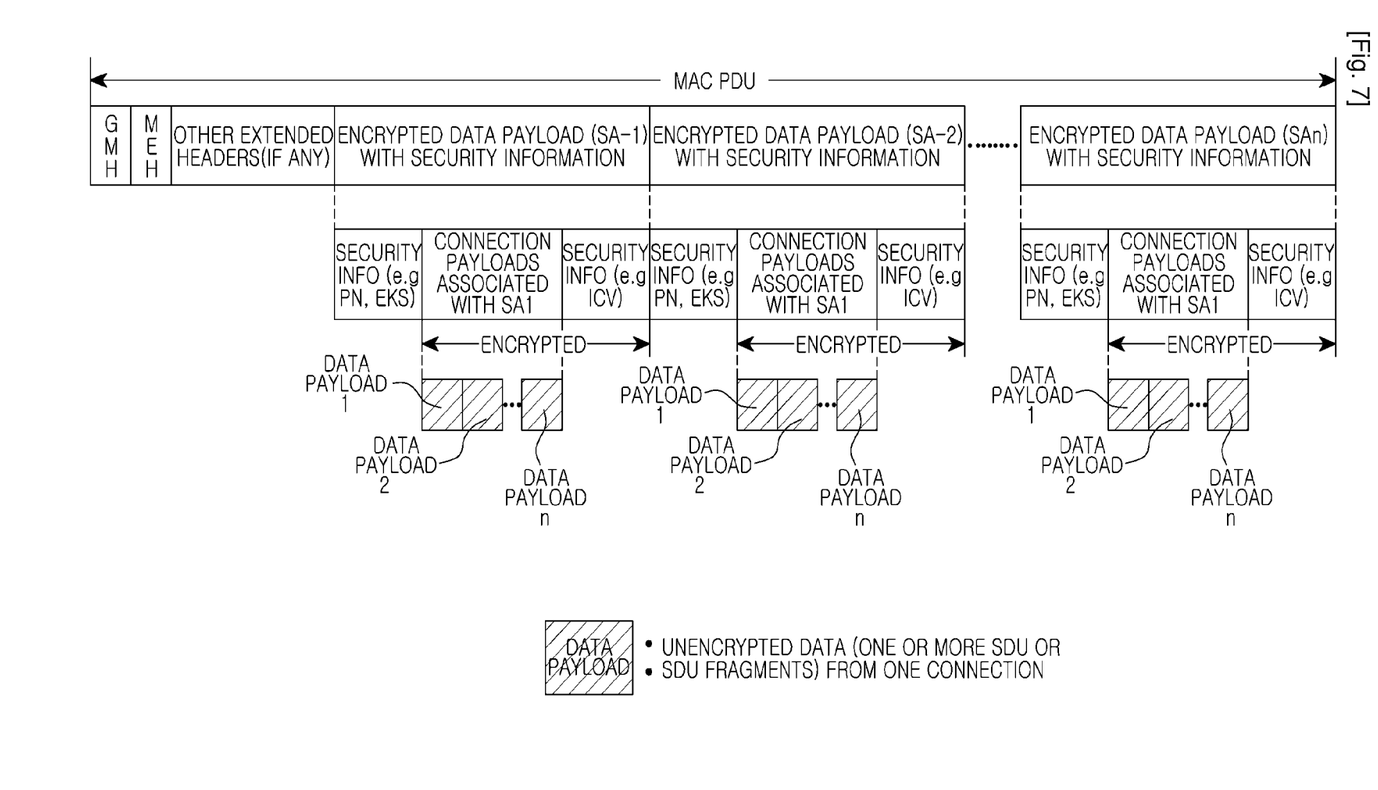
FIG. 7 is an exemplary illustration of a MAC PDU generated for data payloads from multiple connections associated with multiple security associations, in accordance with one embodiment.

FIG. 7 an exemplary illustration of a MAC PDU generated for data payloads from multiple source connections associated with multiple security associations, in accordance with another embodiment.

For example, consider data payloads from 'n' different source connections. Each of 'n' different source connections is associated with a SA. Data payloads from the source connections associated with same security association (SA) are concatenated and encrypted. The encrypted data payloads corresponding to each SA are concatenated. For example, the data payloads belonging to SA1, SA2, and SAn are concatenated independently. Security information comprising the packet number (PN) and the integrity check value (ICV) are added to each concatenated data payload corresponding to each SA. The PN is generated for the concatenated data payloads encrypted in entirety. The PN is pre pended to the encrypted data payload and the ICV is appended to the encrypted data payload. Alternatively, an extended security header can also be generated and appended to the MPDU. The extended security header can include the security information, but is not limited to, PN, encryption key sequence (EKS), and ICV associated with the concatenated data payloads. Further, the encrypted data payloads belonging to SA1, SA2 and SAn are concatenated to create the MPDU.

Further, a GMH and an additional multiplexing extended header (MEH) are generated for the MPDU. The GMH and the MEH together identify the source connections with data payloads concatenated in each encrypted data payload in the MPDU corresponding to each SA. The GMH and the MEH together also determine length of each data payload from each source connection in the encrypted data payload corresponding to each SA. The GMH and the MEH include source connection information corresponding to each encrypted data payload. The source connection information is arranged in same sequence of arrangement of each encrypted data payload present in the MPDU. For example, the source connection information corresponding to a first encrypted data payload is followed by the source connection information corresponding to a second encrypted data payload.

Further, the source connection information corresponding to each encrypted data payload includes data payload information corresponding to each source connection. The data payload information is arranged in same sequence of arrangement of each data payload in the encrypted data payload. For example, the data payload information corresponding to a first source connection is followed by the data payload information corresponding to a second source connection. The MPDU is then transmitted to a receiver.

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of the present disclosure.

The invention claimed is:

1. A method for transmitting data in a wireless communication system, the method comprising:
    determining a plurality of payloads on multiple connections associated with a same security association;
    concatenating the plurality of payloads associated with the same security association; and
    encrypting the concatenated payload associated with the security association together in a Medium Access Control (MAC) Protocol Data Unit (PDU); and
    transmitting a signal corresponding to the MAC PDU,
    wherein the MAC PDU includes an integrity check value (ICV), and
    wherein the plurality of payloads on multiple connections includes a first payload of a first connection and a second payload of a second connection.

2. The method of claim 1, further comprising:
    generating security information for the concatenated payload; and
    appending the security information to the concatenated payload.

3. The method of claim 1, further comprising at least one of:
    generating a first PDU for the encrypted payload for each security association; and
    generating a second PDU for the encrypted payloads for at least two security associations.

4. The method of claim 3, wherein the generating of the first PDU for the encrypted payload for each security association comprises generating a header for first PDU associated with each security association, and
    wherein the generating of the second PDU for the encrypted payloads for at least two security associations comprises generating a header for the second PDU associated with at least two security associations.

5. The method of claim 4, wherein the generating of the header for the first PDU corresponding to each security association comprises:
    determining connection identifiers associated with each connection corresponding to the security association;
    determining lengths of the payloads associated with each connection corresponding to the security association; and
    determining security information.

6. The method of claim 4, wherein the generating of the header for the second PDU corresponding to at least two security associations comprises:
    determining connection identifiers associated with each connection corresponding to each security association;
    determining lengths of the payloads associated with each connection corresponding to each security association; and
    determining security information.

7. The method of claim 3, further comprising:
    generating the header in combination with a generic media access control header (GMH) generated for one of the first and second PDUs; and
    appending the header to the GMH.

8. The method of claim 3, further comprising:
    generating an extended security header, wherein the extended security header comprises security information associated with the concatenated payload; and
    appending the extended security header to one of the first and second PDUs.

9. The method of claim 1, wherein the encrypting of the concatenated payload is performed using Advanced Encryption Standard (AES) Counter with a Cipher block Chaining Message authentication code (CCM).

10. The method of claim 1, wherein the MAC PDU further includes a header indicating a length of the MAC PDU and each length of the plurality of payloads.

11. The method of claim 1, wherein the MAC PDU includes at least one MAC header that is applied to the plurality of payloads in common.

12. A method for receiving a signal in the wireless communication system, the method comprising:
    receiving a signal corresponding to a Medium Access Control (MAC) Protocol Data Unit (PDU) including a concatenated payload, the concatenated payload including a plurality of payloads on multiple connections associated with a same security association;
    determining if the concatenated payload is encrypted; and
    decrypting the concatenated payload into the plurality of payloads on multiple connections in the MAC PDU using encryption information,
    wherein the MAC PDU includes an integrity check value (ICV), and
    wherein the plurality of payloads on multiple connections includes a first payload of a first connection and a second payload of a second connection.

13. The method of claim 12, further comprising: delivering the decrypted payloads to the plurality of connections.

14. The method of claim 13, further comprising:
    determining security information for the decrypted payloads; and
    eliminating the security information to the decrypted payloads.

15. The method of claim 12, wherein the decrypted payloads are decrypted using Advanced Encryption Standard (AES) Counter with a Cipher block Chaining Message authentication code (CCM).

16. The method of claim 12, wherein the encryption information needed to decrypt the plurality of payload is present at a beginning of a first connection payload and at an end of a last connection payload.

17. The method of claim 12, wherein the MAC PDU further includes a header indicating a length of the MAC PDU and each length of the plurality of payloads.

18. The method of claim 12, wherein the MAC PDU includes at least one MAC header that is applied to the plurality of payloads in common.

19. An apparatus for transmitting a signal in the wireless communication system, the apparatus comprising:
a processor configured to execute one or more modules; and
a transmission module for transmitting a signal corresponding to a Medium Access Control (MAC) Protocol Data Unit (PDU),
wherein the one or more modules comprises:
a determination module for determining if a plurality of payloads on multiple connections are associated with a same security association; and
an encryption module for concatenating the plurality of payloads associated with the same security association and encrypting the concatenated payload associated with the security association together in the MAC PDU,
wherein the MAC PDU includes an integrity check value (ICV), and
wherein the plurality of payloads on multiple connections includes a first payload of a first connection and a second payload of a second connection.

20. The apparatus of claim 19, wherein the encryption module generates security information for the concatenated payload and appends the security information to the concatenated payload.

21. The apparatus of claim 19, wherein the encryption module performs at least one of:
generating a first PDU for the encrypted payload for each security association; and
generating a second PDU for the encrypted payloads for at least two security associations.

22. The apparatus of claim 21,
wherein the encryption module generates at least one of a header for the first PDU associated with each security association and generates a header for the second PDU associated with at least two security associations.

23. The apparatus of claim 22, wherein the encryption module performs at least one of:
generating the header in combination with a generic media access control header (GMH) generated for at least one of the first and second PDUs; and
appending the header to the GMH.

24. The apparatus of claim 21, wherein the encryption module generates an extended security header and appends the extended security header to at least one of the first and second PDUs, wherein the extended security header comprises security information associated with the concatenated payload.

25. The apparatus of claim 21, wherein the encryption module determines connection identifiers associated with each connection corresponding to the security association, determines lengths of the payloads associated with each connection corresponding to the security association, and determines security information.

26. The apparatus of claim 21, wherein the encryption module determines connection identifiers associated with each connection corresponding to each security association, determines lengths of the payloads associated with each connection corresponding to each security association, and determines security information.

27. The apparatus of claim 26, wherein the encryption information needed to decrypt the plurality of payload is present at a beginning of a first connection payload and at an end of a last connection payload.

28. The apparatus of claim 19, wherein the encryption module encrypts the concatenated payload using Advanced Encryption Standard (AES) Counter with a Cipher block Chaining Message authentication code (CCM).

29. The apparatus of claim 19, wherein the MAC PDU further includes a header indicating a length of the MAC PDU and each length of the plurality of payloads.

30. The apparatus of claim 19, wherein the MAC PDU includes at least one MAC header that is applied to the plurality of payloads in common.

31. An apparatus for receiving a signal in the wireless communication system, the apparatus comprising:
a processor configured to execute one or more modules,
wherein the one or more modules comprises:
a receiving module for receiving a signal corresponding to a Medium Access Control (MAC) Protocol Data Unit (PDU) including a concatenated payload, the concatenated payload including a plurality of payloads on multiple connections associated with a same security association; and
a decryption module for determining if the concatenated payload is encrypted and decrypting the concatenated payload into the plurality of payloads on multiple connections in the MAC PDU using encryption information, and
wherein the MAC PDU includes an integrity check value (ICV), and
wherein the plurality of payloads on multiple connections includes a first payload of a first connection and a second payload of a second connection.

32. The apparatus of claim 31, wherein the decryption module delivers the decrypted payloads to the plurality of connections.

33. The apparatus of claim 32, wherein the decryption module determines security information for the decrypted payloads and eliminates the security information to the decrypted payloads.

34. The apparatus of claim 32, wherein the decrypted payloads are decrypted using Advanced Encryption Standard (AES) Counter with a Cipher block Chaining Message authentication code (CCM).

35. The apparatus of claim 31, wherein the MAC PDU further includes a header indicating a length of the MAC PDU and each length of the plurality of payloads.

36. The apparatus of claim 31, wherein the MAC PDU includes at least one MAC header that is applied to the plurality of payloads in common.

* * * * *